United States Patent [19]

Wajda

[11] 4,007,989
[45] Feb. 15, 1977

[54] HADAMARD FILTER DESIGN

[75] Inventor: Edward S. Wajda, Poughkeepsie, N.Y.

[73] Assignee: International Business Machines Corporation, Armonk, N.Y.

[22] Filed: Sept. 29, 1975

[21] Appl. No.: 618,308

[52] U.S. Cl. .......................... 356/96; 250/237 G
[51] Int. Cl.² ............................................ G01J 3/42
[58] Field of Search .................. 356/96, 97, 98; 250/237 G; 350/167

[56] References Cited

UNITED STATES PATENTS

| | | | |
|---|---|---|---|
| 3,348,264 | 10/1967 | Rice et al. | 350/167 |
| 3,533,682 | 10/1970 | Fleisher et al. | 350/167 |
| 3,640,625 | 2/1972 | Ibbett et al. | 356/97 |
| 3,929,398 | 12/1975 | Bates | 356/186 |

Primary Examiner—Vincent P. McGraw
Attorney, Agent, or Firm—Douglas R. McKechnie

[57] ABSTRACT

An improved Hadamard filter is disposed between the dispersive element and detector of a Hadamard transform spectrometer. The detector has a series of linear photo-active diode elements arranged in the focal plane of an array of optical lenses. The lenses may be a series of Fly's-Eye lenses with each series arranged to overlay the corresponding linear element of the detector, or may be a cylindrical lens overlying a corresponding detector element. Individual lenses of the Fly's-Eye lens or individual elements of the cylindrical lens are selectively masked according to the desired matrix so as to perform the Hadamard transform spectrometry.

5 Claims, 4 Drawing Figures

HADAMARD FILTER DESIGN

FIELD OF THE INVENTION

This invention relates to spectrometry and, more particularly, to improvements in filter design for Hadamard transform spectrometers.

BACKGROUND OF THE INVENTION

In conventional spectrometers, a beam of spectral energy composed of the separate wavelengths to be analyzed, is passed through a dispersive element to disperse the band into a spectrum wherein the separate wavelengths are spatially spread out. A slit is used to pass only a narrow band of the wavelengths to a detector and the individual wavelengths are analyzed or scanned by mechanically moving either the dispersive element or the slit. The slit needs to be relatively narrow to achieve a fine resolution and the energy contained within the bandwidth passed by the slit is relatively small in comparison to the energy of the whole spectrum being scanned. The detector thus measures a relatively small signal so that the signal-to-noise ratio is relatively low thereby decreasing the spectrometer sensitivity.

Described in "Hadamard-Transform Analytical Spectrometer" by John A. Decker, Jr., "Analysis Instrumentation - Volume 10", Instrument Society of America, pages 49–54 and in U.S. Pat. No. 3,578,980 — Decker, Jr. et al. is a Hadamard-Transform Spectrometer (HTS). The HTS is an analytical instrument useful in both the visible and the infrared spectral regions and performs Fourier-Transform interferometric spectrometry functions while using the simple technology of conventional dispersive spectrometers. The HTS is a multiplex instrument, which means that it observes all the wavelengths in a spectrum at the same time and hence has a multiplex advantage of a high signal-to-noise ratio over conventional scanning monochromator spectrometers. The HTS is also a transform instrument, so that multiplexing is accomplished through an optical coding process, and the measured data points are the mathematical transform of the inputted dispersed optical spectrum. The HTS uses conventional dispersive optics (prisms, gratings, etc.) for spectral discrimination, and is not an interferometric instrument.

Hadamard spectroscopy is implemented by placing a series of masks at the exit or entrance slit of a conventional dispersion spectrometer. For each mask a different combination of spectral elements falls on the detector. Intensities measured with N different masks can be used to compute the intensities of N different spectral elements. This can be represented by a set of simultaneous linear algebraic equations represented in matrix notation as follows:

$$(a_{ij}) [x_j] = [I_i]$$

$$i = 1 ----- N$$
$$j = 1 ----- N$$

Here $x_j$ denotes the intensities of the desired spectral elements and $I_i$ is the combined measured intensity. The elements of the coefficient matrix $[a_{ij}]$ may be chosen such that the above equations can be inverted and solved for $[X_j]$ when the $I_i$ values are measured. Thus, by a proper choice of transparent and opaque elements along the elements of the encoding masks, it is possible to deduce the intensity of the spectral radiation through each such element from sequential measurements of the radiation intensity reaching a detector. Instead of N masks, a single mask may be used having (2N-1) elements. The above article and patent describe further details of the prior art HTS.

An HTS of the above type is disadvantageous because it is relatively slow due to the need to either replace or substitute one mask for the other or to step along a single mask between the various positions and, in addition, requires the use of a relatively costly mechanism for precisely locating the mask or moving the single mask.

SUMMARY OF THE INVENTION

The principal object of the invention is to provide a Hadamard-Transform spectrometer having an improved filter system involving no movable parts.

Another object of the invention is to provide a high-speed electro-optical Hadamard filter system in which Hadamard masks are made on multiple optical lenses for coaction with an electronically scannable detector.

Briefly, the manner in which the above and other objects and advantages of the invention are attained is to provide a Hadamard filter in the form of multiple lenses certain ones of which are rendered opaque to provide N linear masks of N elements. The lenses may be Fly's-Eye lenses or cylindrical ones which focus the energy transmitted therethrough onto a series of linear photodiode detectors corresponding in number N to the number of masks. The outputs of the detectors may be electronically scanned.

The foregoing and other objects, features and advantages of the invention will be apparent from the following more particular description of preferred embodiments of the invention, as illustrated in the accompanying drawing.

THE DRAWING

DETAILED DESCRIPTION

Figure 1:
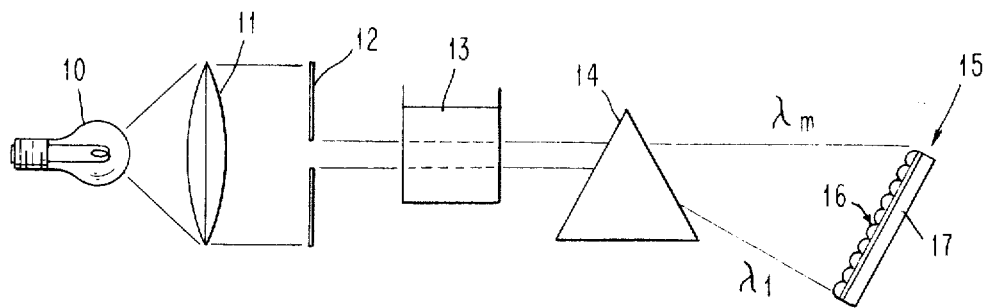
FIG. 1 is a schematic diagram of a portion of a Hadamard transform spectrometer embodying the invention.

Referring now to the drawing, and first FIG. 1, a Hadamard transform spectrometer (HTS) includes a wide band light source 10. A collimating lens 11 directs light from source 10 onto an opaque element 12 having a slit therein which allows a portion of the light to pass through. A test sample 13, here shown as liquid within a container, is diposed in the path of the light beam passing through element 12. The beam after passing through the sample passes through a prism 14 that acts as a dispersive element to disperse the beam in a spectral band having wavelengths ranging from $\lambda_1$ to $\lambda_m$. A Hadamard filter 15, described in detail below, is placed in the path of the dispersed band so as to receive the spectral energy of the foregoing wavelengths. The filter comprises a lens array 16 and a photodiode array 17. It is to be understood that this system is merely illustrative of only one possible environment for the invention and that other basic spectrometer arrangements can be used. For instance, light from any source can be analyzed in this manner and in such case light source 10 and sample 13 can be omitted so the light to be analyzed merely falls upon the lens 11, passes through the slit of mask 12 and through prism 14 for dispersion thereby.

Figure 2:
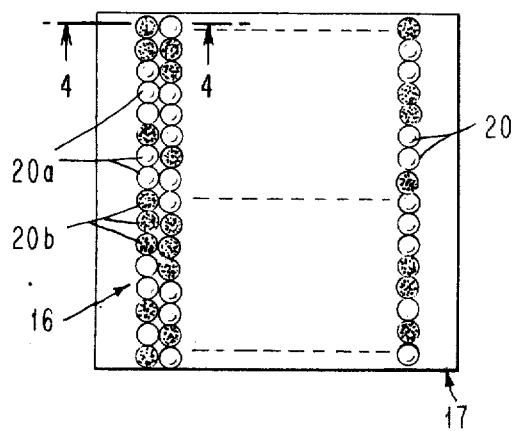
FIG. 2 is a plan view of the Fly's-Eye lenses of the filter.

As best seen in FIG. 2, the lens array 16 comprises an array of Fly's-Eye lenses arranged in a plurality of rows wherein each row has a plurality of lens elements 20. In accordance with the known principles of the Hadamard transform spectrometry, the number of rows and number of elements in each row corresponds to the number of spectral elements to be analyzed. To provide the Hadamard mask, certain ones of the lens elements 20 in each row are rendered opaque. Thus, lens element 20a as shown in FIG. 2 is transparent so that light passes therethrough and lens element 20b is opaque to block the passage of light. The particular ones which are thus rendered opaque and transparent is, as known, dependent upon the spectral elements to be analyzed. Reference may be had to the aforementioned patent for the detailed description of a nineteen element array or mask and the particular lenses 20 to be rendered opaque and transparent can be done in accordance with the example given in such patent.

Figure 3:
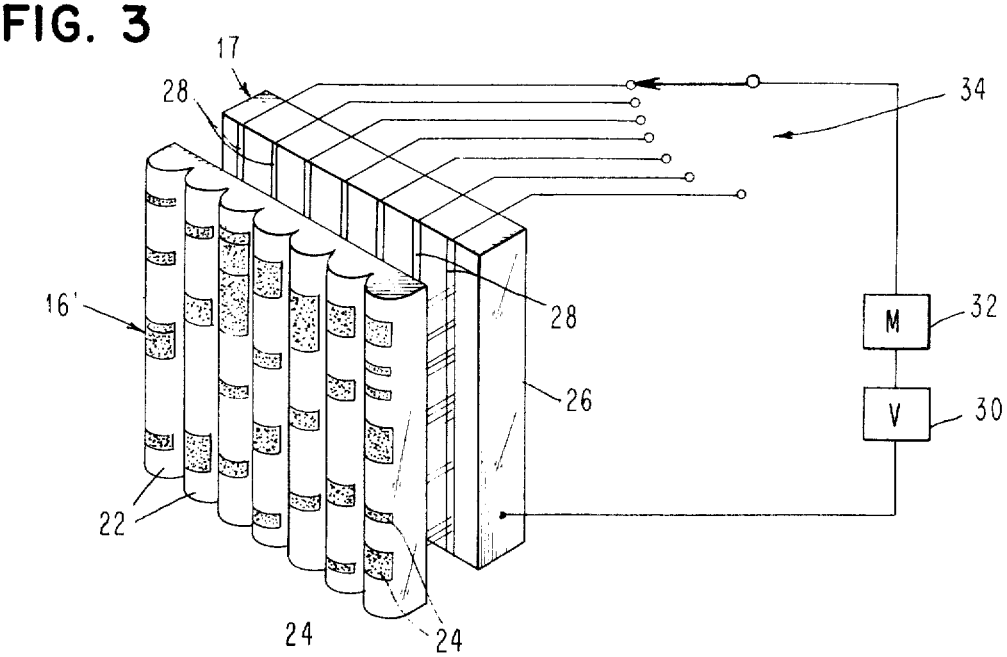
FIG. 3 is a schematic view, partially exploded, of a filter having a cylindrical lens and of the scanning readout.

FIG. 3 shows an alternative design to the Fly's-Eye type lens wherein a lens array 16' comprises a series of cylindrical lenses 22. Portions 24 of each cylindrical lens can be rendered opaque by coating with a suitable opaque material to produce the desired Hadamard mask.

Figure 4:
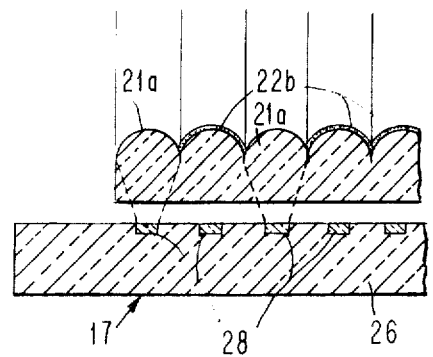
FIG. 4 is a sectional view, partially exploded, along lines 4—4 of FIG. 2.

As best seen in FIGS. 3 and 4, the photodiode array 17 comprises a semiconductive substrate 26 doped to either a P or N level and a series of linear areas 28 doped with a photoactive material to the opposite P or N state to provide a series of elongated linear photodiodes. The lens array 16 or 16' are placed next to array 17 whereby each row of array 16 is aligned with a different area 28 or whereby lens 22 of array 16' are aligned with the respective areas 28. The elements of the lens arrays are designed to concentrate the incident light thereon onto the photoactive areas 28 of the diode array 17. The base 26 is connected to a source of voltage 30 and the respective areas 28 are individually connected to an electronic scanning means 34. A meter 32 is connected within the circuit whereby the individual diodes formed by one row 28 on base 26 can be selectively activated or scanned whereby the meter or sensing device indicates the current produced as a result of the biasing of the diodes and the light falling thereon. Quite obviously, the meter 32 could include some means for amplifying the current, and an analog-to-digital converter connected to a digital display for indicating the value. Alternatively, instead of the digital display, the converted signals may be fed to a computer for analyzing the results.

In summary of the system, mask 12 provides an elongated narrow beam of light that is passed through sample 13 and through dispersive element 14. This latter element disperses the beam onto a filter 15. The filter includes a series of lenses disposed in the dispersed beam so as to receive the range of wavelengths $\lambda_l - \lambda_m$ to be analyzed. Each row of the lens provides a different Hadamard mask for filtering out the different spectral elements. As the photodiode array 26 is scanned, the amount of current that flows through each diode is proportional to the intensity of all of the light that is incident on each individual area 28 of the array. The result is that the thus derived signal has a high signal-to-noise ratio because of the inherent nature of the Hadamard transform spectrometry. In addition, the individual diodes can be scanned at electronic speeds without having to use any moving parts. One suitable type of scanning mechanism is a scannistor.

Although the invention has been shown and described with respect to advantageous embodiments thereof, it should be understood by those skilled in the art that various changes in form and detail may be made therein without departing from the spirit and scope of the invention as defined in the following claims.

What is claimed is:

1. In a Hadamard transform spectrometer having a dispersive element arranged to disperse an elongated beam of spectral energy to be analyzed, the combination comprising:
    a lens array disposed in the path of the dispersed beam and having a plurality of lens rows corresponding in number to at least the number of spectral elements to be analyzed, each row receiving spectral energy dispersed over a bandwidth containing such spectral elements, said array further comprising opaque means on said array providing a Hadamard mask in each lens' row,
    and a photodiode array comprising a plurality of linear photodiode means corresponding to the number of lens' rows, said diode array being juxtaposed to said lens array whereby each lens' row directs the spectral energy incident thereon onto a different one of said photodiode means.

2. The combination of claim 1 wherein said lens array comprises an array of Fly's-Eye lenses arranged with a plurality of lenses in each lens' row, and said opaque means blocks predetermined ones of said lenses.

3. The combination of claim 1 wherein said lens array comprises a plurality of elongated cylindrical lenses, and said opaque means blocks predetermined areas of said lenses.

4. The combination of claim 1 comprising: scanning means connected to said photodiode array and operative to provide electrical signals proportional to the amount of light incident on each of said photodiode means.

5. The combination of claim 1 wherein said photodiode means comprises a semi-conductive base and an elongated area extending along a lens row and doped with a photoactive material.

* * * * *